Figure 1:
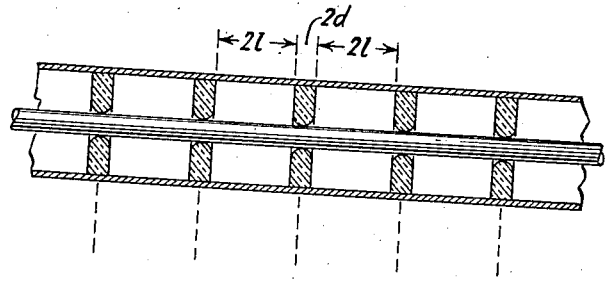

April 27, 1943.  H. BUCHHOLZ  2,317,439
TRANSMISSION SYSTEM FOR ULTRA SHORT WAVES
Filed Aug. 31, 1940

TERMINAL RESISTANCE

INVENTOR
HERBERT BUCHHOLZ
BY
ATTORNEY

Patented Apr. 27, 1943

2,317,439

UNITED STATES PATENT OFFICE 2,317,439

TRANSMISSION SYSTEM FOR ULTRASHORT WAVES

Herbert Buchholz, Berlin, Germany, assignor to General Electric Company, a corporation of New York Application August 31, 1940, Serial No. 354,993
In Germany May 26, 1939

4 Claims. (Cl. 178—44)

This invention deals with a transmission system for ultra-short waves and more particularly that a transmission system wherein a concentric conductor system is used whose dielectric consists of air and regularly spaced disks (called dividing elements) of a solid insulating material. The effective length of a dividing element, which is the sum of the axial length of the air dielectric and the actual axial length of the dielectric layers of the spacing disks times the root of the particular dielectric constant of the spacing discs, is chosen to be smaller than half the wave length of the wave to be transmitted.

It is generally known to use concentric conductors or cables for the transmission of high frequency in which disks of a dielectric material are arranged at certain distances for spacing purposes. The distances between the disks in that case are so small compared to the operative wave length that the distribution of the dielectric may be considered to be homogeneous.

It has been found that the disks, having a dielectric constant larger than that of the dielectric air, act as small concentrated capacitances when the operating frequency is raised to such an extent that the wave length is of the same order of magnitude as the disk spacings. These concentrated capacitances become particularly effective for the maximum voltage amplitude of a progressing wave, while the capacitance of the concentric line which lies distributed between the disks is much less effective, because on this element there is present at the same time a voltage node and because this element therefore has a more inductive effect. A cable designed according to Fig. 1 with a dielectric in longitudinal layers can therefore be represented by the equivalent diagram of the line shown in Fig. 2. Such an arrangement, however, possesses the properties of a filter, in other words, it has ranges of passage and ranges of blocking. These properties up to the present have made impossible a utilization of concentric conductors with a dielectric in longitudinal layers for the transmission of decimeter waves since the filtering properties of such a conductor system had not been recognized as such, so that it was also impossible to analyze the location of the disturbing blocking ranges. The latter is, however, possible on the basis of the above-cited knowledge and it has been found that the filter properties of such a concentric conductor system with a dielectric in longitudinal layers depend primarily not only on the dielectric constant of the disks but, also, on the axial dimensions of the dielectric of which they are composed.

The invention is based on the above-given fact and lies in the fact that for the transmission of ultra short waves, concentric lines or cables are used with a dielectric in longitudinal layers, whose dielectric consists of air and of disks of a solid insulating material which are arranged at regular distances as spacers and in which the effective length of a dividing element, that is, one disk and one adjacent airspace, is smaller than half the wave length of the wave to be transmitted.

Since the filtering properties of the concentric conductor system that is used must be considered as those of a low pass filter, care must be taken that the maximum frequency to be transmitted is smaller than the lowest frequency limit of the blocking range. The frequency limits of the blocking ranges can, however, be calculated from the following function:

$$\frac{1}{\sqrt{\epsilon_1}} \leq \tan kl \cdot \tan kl\alpha \leq \sqrt{\epsilon_1}$$

$$-\frac{1}{\sqrt{\epsilon_1}} \leq \tan kl \cdot \cot kl\alpha \leq -\sqrt{\epsilon_1}$$

Figure 2:
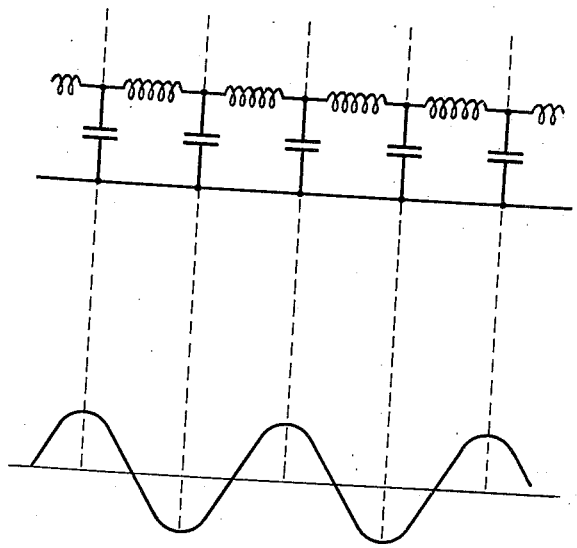

In these formulas $2l$ is the length of the air dielectric between two disks, as shown in Fig. 1, $k$ is the phase measure $$\frac{2\pi}{\lambda}$$

and $\alpha$ is the ratio $$\frac{d}{l}\sqrt{\epsilon_1}$$

in which $2d$ is the axial length of the dielectric disk and $\epsilon_1$ its relative dielectric constant. If, consequently, a cable designed in this manner is to be utilized for the transmission of decimeter waves, then the spacing of the disks, their thickness and dielectric constant must be selected in such a way that $$4(l+d\sqrt{\epsilon_1}) \ll \lambda_{min}$$

in which $\lambda_{min}$ is the shortest wave length to be transmitted and $2l+2d\sqrt{\epsilon_1}$ is the "effective length" of a dividing element of the concentric line. Expressed in a numerical example, this would therefore mean that in the case of a wave length to be transmitted of $\lambda=20$ cm., the effective dividing length must be much smaller than $$\frac{\lambda}{2} = 10 \text{ cm.}$$

Such a conductor would have, for instance in the case of a dielectric constant of the disks of $\epsilon_1=4$, the following maximum limits in the axial dimensions: Length of the air dielectric $2l=6$ cm., thickness of the disks $2d=2$ cm. The disk thickness is a factor which must be taken into consideration for the reason that the solid dielectric material has, as mentioned in the above numerical example, a dielectric constant which is four times the surrounding air which is taken as unity, thus, the volume of air located within the space $2l$ between the spaces depends upon the thickness of the spaces. It will be therefore seen that if the wall thickness is substantially large with respect to the space $2l$, the capacity between the dotted lines will be greater than the condition wherein the wall thickness of the spacer is substantially small with respect to the space. Such a change in capacity will change the characteristic value of the resultant low pass filter. In the practical evaluation this means that for a very short wave length the spacings of the disks and their thickness must be very small. The dielectric constant in that case is not of such great importance because only the root of that value enters into the calculation.

Figure 1A:
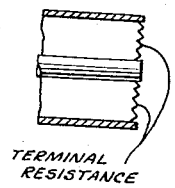

It is generally customary to terminate the cable with a constant resistance. The calculation and measurements show, however, that in the case of concentric cable with a dielectric in longitudinal layers, the input resistance drops intensively when approaching the critical frequency. When the termination of the cable is a constant resistance, then additional reflections will occur which intensively affect the transmission of the cable. According to Fig. 1A an additional feature of the invention is shown which includes a resistance with frequency relation and is used as the terminal resistance; it has the same frequency curve as the characteristic impedance of the cable and therefore terminates the cable free from reflections.

What is claimed is:

1. A transmission system for ultra-short waves comprising a tubular outer conductor, an inner conductor coaxially arranged with respect to said outer conductor, a plurality of successively arranged solid dielectric disks for concentrically spacing said inner conductors, each disk together with an air space therebetween forming a dividing element of a low pass electric filter, the effective length of said dividing element being the sum of the axial thickness of the dielectric discs each being multiplied by the square root of its dielectric constant and the axial length of said air space, said effective length being smaller than one-half the wave length of the wave to be transmitted.

2. A transmission system according to claim 1 wherein the concentric conductor system formed by the inner and outer conductors is terminated by a frequency related resistance which has the same frequency curve as the characteristic impedance of a conductor system.

3. A transmission system for ultra-short waves comprising a tubular outer conductor, an inner conductor coaxially arranged with respect to said outer conductor, a plurality of solid dielectric discs for concentrically spacing said inner conductor, said solid dielectric discs successively arranged with an air space between them so as to have the passing and blocking properties of an electric filter for the transmission of decimeter waves; the axial spacing thickness and dielectric constant of said discs being selected in such a way that $$4(l+d\sqrt{\epsilon_1}) \ll \lambda_{min}$$

in which $\lambda_{min}$ is the shortest wave length to be transmitted, wherein $l$ is the axial length of the air space between the discs, $d$ is the axial length of the solid dielectric discs, and $2l+2d\sqrt{\epsilon_1}$ is the effective length of a dividing element of the concentric line.

4. A combined coaxial transmission line and wave filter for ultra short waves, comprising a pair of coaxially arranged conductors, a plurality of insulating elements in the form of discs arranged at uniform intervals along said line for mechanically holding said conductors in coaxial relationship, the axial length ($2d$) of said discs and the axial length of the unsupported line between successive discs ($2l$) and the dielectric constant ($\epsilon_1$) of the material of said discs being so chosen that the quantity $2(2l+2d\sqrt{\epsilon_1})$ is less than the wave length of the shortest wave to be transmitted through said combined line and filter.

HERBERT BUCHHOLZ.